(12) United States Patent
Roberts et al.

(10) Patent No.: US 11,444,456 B2
(45) Date of Patent: Sep. 13, 2022

(54) GROUND FAULT INTERRUPT AND USB POWER SUPPLY ELECTRICAL WIRING DEVICE

(71) Applicant: Pass & Seymour, Inc., Syracuse, NY (US)

(72) Inventors: Clayton Roberts, Tully, NY (US); Jeffrey C. Richards, Baldwinsville, NY (US); Kristopher E. Glassford, East Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 17/088,785

(22) Filed: Nov. 4, 2020

(65) Prior Publication Data

US 2021/0135452 A1    May 6, 2021

Related U.S. Application Data

(60) Provisional application No. 63/063,641, filed on Aug. 10, 2020, provisional application No. 62/930,185, filed on Nov. 4, 2019.

(51) Int. Cl.
*H02H 9/04* (2006.01)
*H02H 7/20* (2006.01)
*H02H 3/16* (2006.01)
*H02H 3/10* (2006.01)

(52) U.S. Cl.
CPC ............ *H02H 9/046* (2013.01); *H02H 3/105* (2013.01); *H02H 3/167* (2013.01); *H02H 7/20* (2013.01)

(58) Field of Classification Search
CPC .......... H02H 9/046; H02H 7/20; H02H 3/167; H02H 3/105; H02H 9/041; H02H 9/005; H02H 3/335; H02H 3/32; H02H 3/02
USPC ........................................................ 361/42
See application file for complete search history.

(56) References Cited

U.S. PATENT DOCUMENTS

2017/0187155 A1* 6/2017 Jansen ..................... H02G 3/12

* cited by examiner

*Primary Examiner* — Dharti H Patel
(74) *Attorney, Agent, or Firm* — Bond, Schoeneck & King, PLLC; Frederick Price

(57) ABSTRACT

An electrical wiring device including a ground fault interrupt assembly, the ground fault interrupt assembly comprising a ground fault interrupt circuit, being formed on a first printed circuit board, and a trip mechanism, the ground fault interrupt circuit being configured to detect a differential current between the line conductor and the neutral conductor and to trigger the trip mechanism to electrically decouple the plurality of line terminals from the plurality of load terminals, according to a predetermined criterion, based, at least in part, on the different current; and a USB power supply circuit being formed on a second printed circuit board disposed within the compartment, the USB power supply circuit providing to the at least one USB port, wherein the first printed circuit board and the second printed circuit board are separated by a distance within the inner compartment.

34 Claims, 13 Drawing Sheets

GROUND FAULT INTERRUPT AND USB POWER SUPPLY ELECTRICAL WIRING DEVICE

CROSS REFERENCE TO RELATED APPLICATIONS

The present application claims priority to and the benefit of U.S. Provisional Patent Application No. 62/930,185 filed on Nov. 4, 2019 and U.S. Provisional Patent Application No. 63/063,641 filed on Aug. 10, 2020, the entireties of which are incorporated herein by reference.

BACKGROUND OF THE INVENTION

1. Field of the Invention

The present invention relates to wiring devices and, more specifically, to a ground fault interrupt electrical wiring device with a USB power supply.

2. Description of the Related Art

The proliferation of mobile devices has created a widespread need for readily available charging ports. Nearly every mobile device can be charged with a charging cable that has a USB connector on one end and a micro USB or lightning connector on the other. The need for readily available charging ports can thus be met by USB ports provided in an electrical wiring device.

Such electrical devices can be equipped to have ground fault protection. Ground faults occur for several reasons. First, the hot conductor may contact ground if the electrical wiring insulation within a load circuit becomes damaged. This scenario represents a shock hazard. For example, if a user comes into contact with a hot conductor while simultaneously contact ground, the user will experience a shock. A ground fault may also occur when the equipment comes in contact with water. A ground fault may also result from damaged insulation within the electrical power distribution system.

A ground fault creates a differential current between the hot conductor and the neutral conductor. Under normal operating conditions, the current flowing in the hot conductor should equal the current in the neutral conductor. Accordingly, GFCIs are typically configured to compare the current in the hot conductor to the return current in the neutral conductor by sensing the differential current between the two conductors. When the differential current exceeds a predetermined threshold, usually about 6 mA, the GFCI typically responds by interrupting the circuit. Circuit interruption is typically effected by opening a set of contacts disposed between the source of power and the load. The GFCI may also respond by actuating an alarm of some kind.

However, the combination of a ground fault interrupt and the accompanying electromechanical assembly for separating the contacts requires considerable space within the housing of an electrical wiring device. The addition of a USB power supply for supplying power to the USB port can result in an electrical wiring device with a relatively large profile. The electrical wiring device housing must remain within certain limits to fit into a standard wall box and to avoid taking up too much space within a wall.

But measures to more compactly fit the USB power supply together with the ground fault interrupt protective device can exacerbate heat management issues of the USB power supply and ground fault interrupt circuit, as heat-generating components are necessarily positioned near one another to minimize the profile of the electrical wiring device. More specifically, various components of the USB power supply and the ground fault interrupt circuit, such as a bridge rectifier, microcontroller or transformer, (these are only provided as example components, as the various components included can vary depending on the particular example USB power supply and ground fault interrupt circuit) produce a relatively large amount of heat. When these components are used together in a compact housing, the heat produced by each can cause the electrical wiring device to overheat.

Accordingly, there is a need for a ground fault interrupt electrical wiring device with a USB charging port that is relatively compact while managing the heat of the USB power supply circuit and ground fault interrupt circuit.

BRIEF SUMMARY OF THE INVENTION

The examples described herein can be combined in any way technically possible.

According to an aspect, an electrical wiring device includes: a plurality of line terminals including a hot line terminal and a neutral line terminal, wherein the plurality of line terminals are configured to be coupled to an AC electrical distribution system; a plurality of load terminals comprising a hot load terminal and a neutral load terminal; a line conductor electrically coupling the hot line terminal to the hot load terminal; a neutral conductor electrically coupling the neutral line terminal to the neutral load terminal; a hot receptacle contact in electrical contact with the hot line terminal when in a reset state and neutral receptacle contact in electrical contact with the neutral line terminal when in the reset state, wherein the hot receptacle contact and the neutral receptacle contact are dimensioned and positioned to receive plug blades of a load plug; a universal serial bus (USB) receptacle configured to receive a USB adapter; a housing defining an inner compartment, wherein the line conductor, the neutral conductor, the hot receptacle contact, the neutral receptacle contact, and the USB receptacle are at least partially disposed in the inner compartment, a ground fault interrupt assembly disposed within the inner compartment, the ground fault interrupt assembly comprising a ground fault interrupt circuit, being formed on a first printed circuit board, and a trip mechanism, the ground fault interrupt circuit being configured to detect a differential current between the line conductor and the neutral conductor and to trigger the trip mechanism to electrically decouple the plurality of line terminals from the plurality of load terminals, according to a predetermined criterion, based, at least in part, on the different current; and a USB power supply circuit being formed on a second printed circuit board disposed within the inner compartment, the USB power supply circuit providing to the USB receptacle, wherein the first printed circuit board and the second printed circuit board are separated by a distance within the inner compartment.

In an example, the electrical wiring device further includes a metal-oxide varistor being in common electrical contact with the ground fault interrupt circuit and the USB power supply circuit to absorb voltage transients in either the ground fault interrupt circuit or the USB power supply circuit.

In an example, the leads of the metal-oxide varistor extend through the first printed circuit board to the second printed circuit board or through the second printed circuit board to the first printed circuit board.

In an example, the ground fault interrupt circuit is electrically insulated from the first printed circuit board by an insulative substrate disposed between the first printed circuit board and the second printed circuit board, wherein the insulative substrate is comprised of a material having a resistivity greater than ambient air.

In an example, a first surface of the insulative substrate is disposed adjacent to the USB power supply circuit, wherein at least one component of the USB power supply circuit is seated within a recess of the insulative substrate, the recess being dimensioned to receive the at least one component.

In an example, a second surface of the insulative substrate is disposed adjacent to the USB power supply circuit, wherein at least one component of the USB power supply circuit is seated within a recess of the insulative substrate, the recess being dimensioned to receive the at least one component.

In an example, the electrical wiring device further includes a second hot receptacle contact in electrical contact with the hot line terminal and a second neutral receptacle contact in electrical with the neutral line terminal.

In an example, the hot receptacle contact is in electrical contact with the second hot receptacle contact by a first fixed contact bridge extending between the hot receptacle contact and the second hot receptacle contact, wherein the neutral receptacle contact is in electrical contact with the second neutral receptacle contact by a second fixed contact bridge extending between the neutral receptacle contact and the second neutral receptacle contact, wherein the first fixed contact bridge and the second fixed contact bridge are respectively diverted toward a perimeter of the housing, wherein at least one of a USB receptacle printed circuit board upon which the USB receptacle is mounted, the USB receptacle, the ground fault interrupt assembly, or the USB power supply circuit is, at least in part, disposed between the first fixed contact bridge and the second fixed contact bridge.

In an example, the USB power supply circuit comprises a transformer, wherein the second printed circuit board includes a first side and a second side, wherein the first side faces the ground fault interrupt assembly, wherein the second side faces away from the ground fault interrupt assembly, wherein the transformer is disposed on the second side of the second printed circuit board.

In an example, each of the components of the USB power supply circuit are disposed on the second side.

In an example, the USB power supply circuit comprises a controller and a bridge rectifier, wherein the controller is separated from the bridge rectifier of by a distance of at least 15 mm.

In an example, the ground fault interrupt assembly is disposed between the USB power supply circuit and a front cover, wherein the USB power supply circuit is electrically connected to the USB receptacle by a conductive wire extending past the ground fault interrupt assembly and between the line conductor and the neutral conductor.

In an example, the USB power supply circuit is in electrical contact with the hot load terminal and the neutral load terminal to receive power when the electrical wiring device is in the reset state.

In an example, the USB power supply circuit is in electrical contact with the hot line terminal and the neutral line terminal.

In an example, the line conductor and the neutral conductor are comprised of a material having a conductivity at least 35% IACS.

In an example, the line conductor and the neutral conductor are comprised of a brass material.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Aspects of the various examples and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. A 15 amp protective wiring device is shown and described herein with respect to the illustrated embodiments. Embodiments of the present invention similarly apply to a 20 amp protective wiring device (as well as other protective wiring devices identified herein), as should be understood and appreciated by a person of ordinary skill in the art in conjunction with a review of this disclosure (i.e., the front cover and neutral side contacts are structurally different, otherwise, embodiments of the invention are structurally and functionally the same).

Reference will now be made in detail to the present exemplary embodiments of the invention, examples of which are illustrated in the accompanying drawings. Wherever possible, the same reference numbers will be used throughout the drawings to refer to the same or like parts.

Various parts/elements of the protective device of embodiments of the present invention are first identified below and illustrated in the accompanying drawings. Many of the parts/elements are conventional, should be understood by a person of ordinary skill in the art in conjunction with a review of this disclosure, and are not necessarily further discussed in detail beyond being identified and represented in certain Figures. The structure, configuration, and positioning with respect to other particular parts/elements/assemblies in the assembled protective wiring device as a whole, and/or functionality of other particular parts/elements/assemblies are unique and inventive. Such other parts/elements/assemblies are described in further detail below in addition to the being identified and represented in certain Figures.

Figure 1:
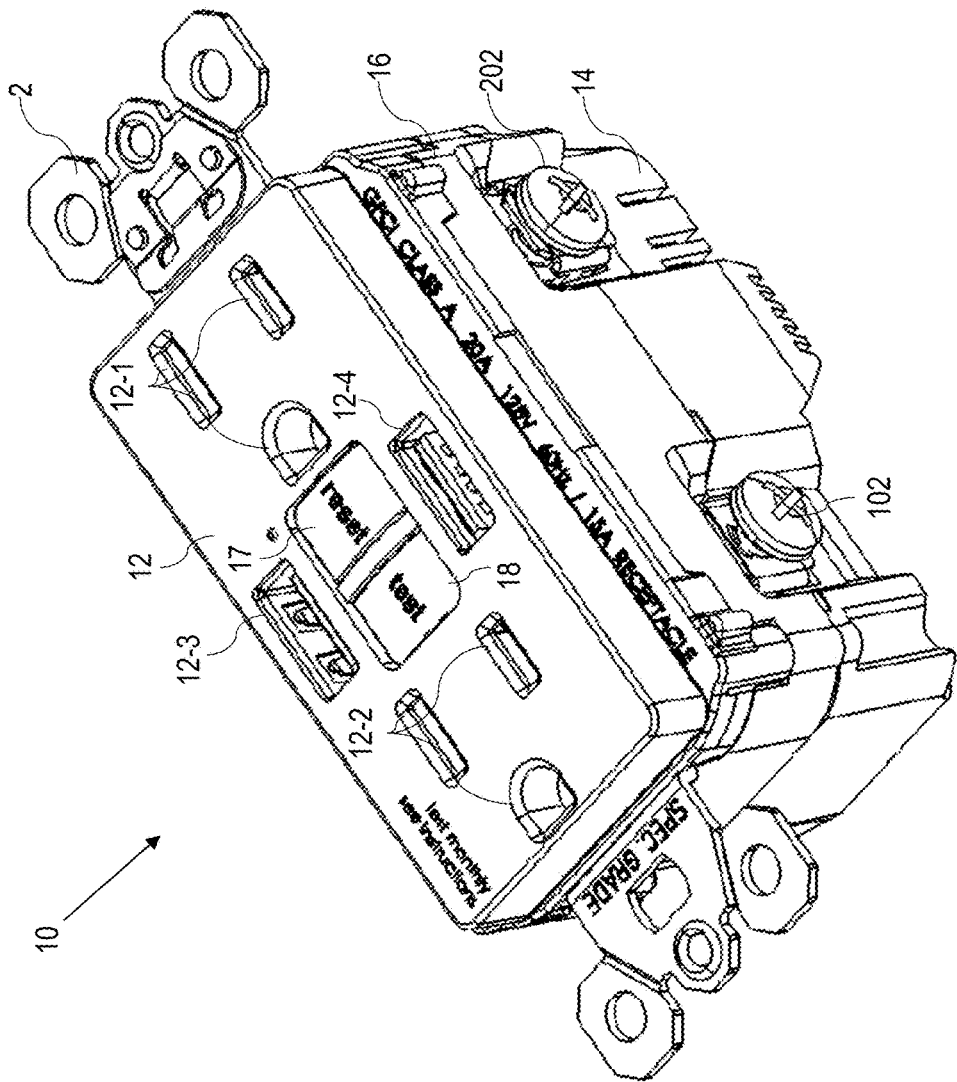
FIG. 1 is a perspective view of a protective device having a ground fault interrupt assembly and a USB power supply, according to an example.

An example of the protective wiring device of the present invention is shown in FIG. 1 and is designated generally throughout by reference numeral 10. FIG. 1 depicts a perspective view of an example assembled protective device 10 having multiple outlet receptacles and USB ports and numerous features to both minimize the profile of the protective device 10 and to manage the heat generated by the USB power supply and the ground fault interruption circuit. These features will be described in detail in this disclosure. Many of these features can be implemented independent of one another (that is, to the extent technically possible, certain examples of protective device 10 can employ some of these features but not others). Further, many of these features can be employed to minimize the profile or to manage heat in electrical wiring devices besides protective device 10; indeed, many can be employed outside of an electrical wiring device with both a ground fault interrupt assembly and a USB power supply and USB port. For example, many of these features can be employed in any ground fault interrupt electrical wiring device (where a USB power supply and USB port are omitted), likewise many of these features can be employed in any electrical wiring device having an DC power supply and charging port (rather than only a USB power and port). Further, although many of these inventive features are shown with a particular example of a ground fault interrupt assembly, many of these features can be used in any suitable ground fault interrupt assembly, as appropriate for the particular ground fault interrupt assembly used.

Certain structural and functional aspects of embodiments of the present invention are similar to embodiments of the protective wiring device described and illustrated in U.S. application Ser. No. 16/967,331 filed on Aug. 4, 2020 and titled "Protective Wiring Device," which is hereby incorporated by reference in its entirety, describes many features of the functioning of the ground fault interrupt assembly and the electrical wiring device in general. To the extent that these ground fault assembly or other features are the same as the features of protective device 10, a detailed explanation has been omitted to avoid needlessly obscuring the inventive features, and U.S. application Ser. No. 16/967,331 should be referred for descriptions of their structure and operation. Furthermore, U.S. application Ser. No. 16/967,331 itself relies upon various patent for the explanation of additional features. These patents are likewise incorporated by reference in their entirety for additional explanation and embodiments and include: U.S. Pat. Nos. 9,437,386, 9,543,715 and 9,893,456.

As shown, the protective device 10 includes a housing having a front cover 12, a back-body 14 and a separator 16, which together define an interior compartment. The front cover 12 includes outlet receptacles 12-1, 12-2 which are configured to accept the hot, neutral and ground blades of a corded plug, and USB ports 12-3, 12-4 which are configured to accept a USB plug (to, e.g., charge a mobile device). The back-body 14 includes line screw terminals 102 and load screw terminals 202 that allow the device to be connected to a source of AC power and a load circuit, respectively.

Figure 2:
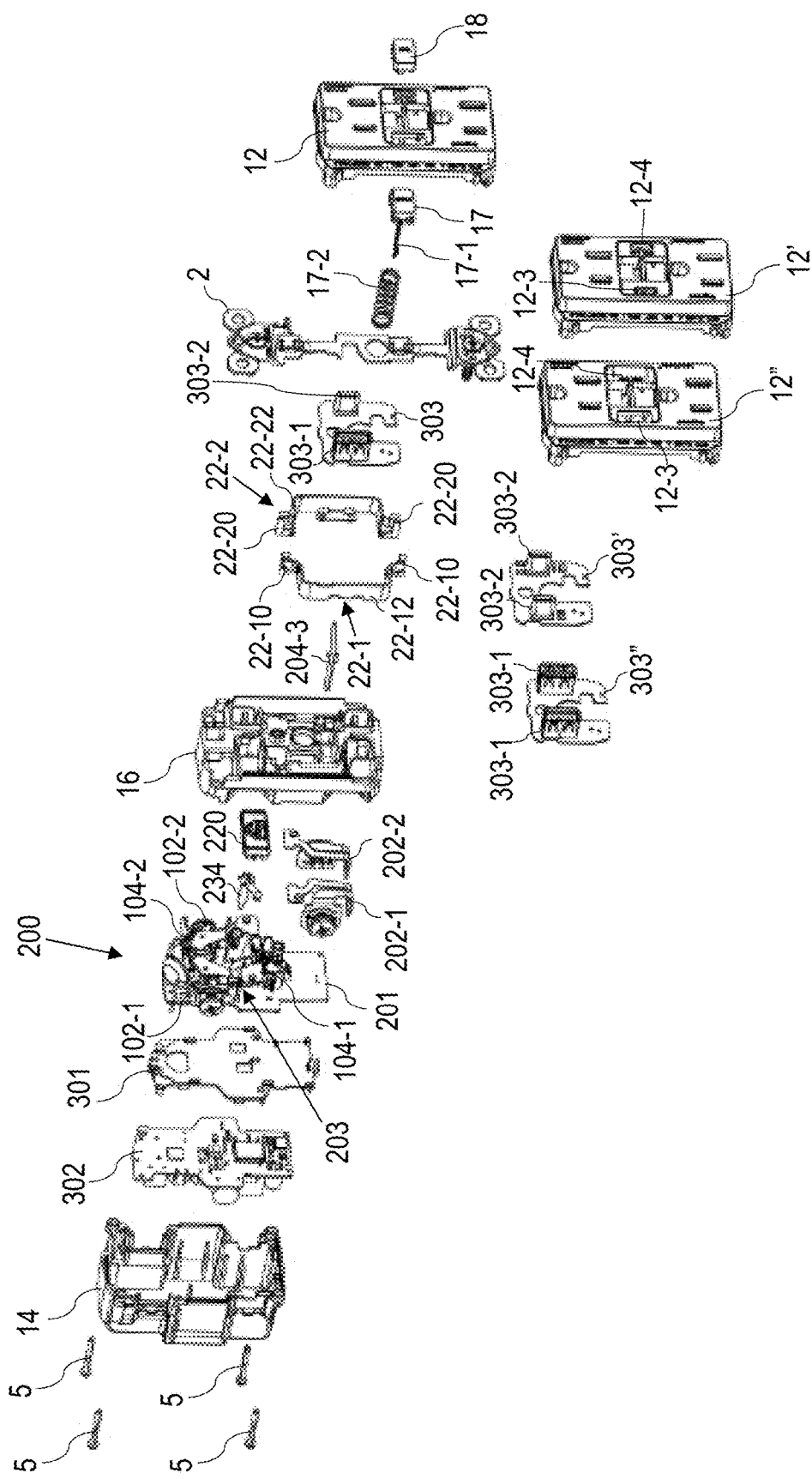
FIG. 2 is an exploded view of a protective device having a ground fault interrupt assembly and a USB power supply, according to an example.

Turning to FIG. 2, a perspective exploded view of the protective device 10 of an example of the present invention is shown. Starting from the top portion of the device, the various parts/elements are now identified: test button 18, front cover 12, reset button 17, reset structure 17-1, reset break spring 17-2, ground strap 2, USB receptacle PCB 303 upon which are mounted a type-A USB receptacle 303-1, and a type B USB receptacle 303-2, a hot receptacle terminal 22-1 including hot outlet receptacle contacts 22-10 and fixed contact bridge 22-12, a neutral receptacle terminal 22-2 including neutral outlet receptacle contacts 22-20 and fixed contact bridge 22-22, light pipe 204-3, separator 16, test contact arm 234, electromechanical assembly 200 (alternatively referred to as "ground fault interrupt assembly") including electromechanical PCB 201 and trip mechanism 203 (which includes latch block 220 and latch 230), hot line contact arm 104-1, neutral line contact arm 104-2, hot line terminal 102-1, neutral line terminal 102-2, hot load terminal arm 202-1, neutral load terminal arm 202-2, spacer 301 (alternatively referred to "insulative substrate"), USB printed circuit board 302, back body 14 (which is elongated in this example to accommodate the USB printed circuit board 302 and spacer 301), and assembly screws 5.

The exploded view of FIG. 2 further depicts an alternative example of front cover 12: front cover 12' and front cover 12". Front cover 12' include USB ports 12-3 and 12-4 for two type A USB receptacles 303-1; whereas front cover 12" includes USB ports 12-3 and 12-4 for two type C USB receptacles 303-2. Front cover 12' interfaces with USB receptacles 303-2 of USB printed circuit board 303'. Front cover 12" interfaces with USB receptacles 303-1 of USB printed circuit board 303".

Figure 10A:
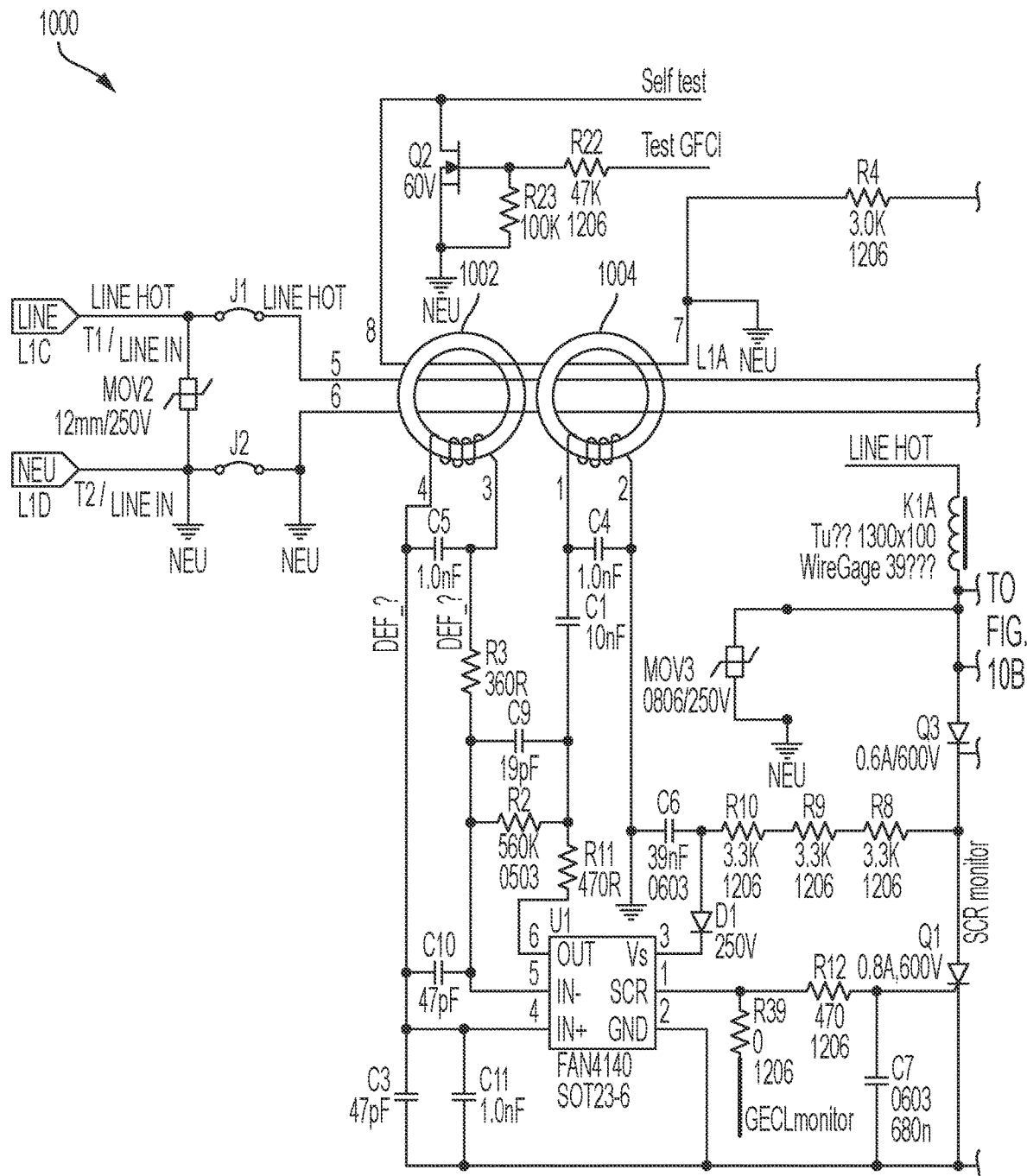
FIGS. 10A and 10B are a schematic of a ground fault interrupt circuit, according to an example.
Figure 10B:
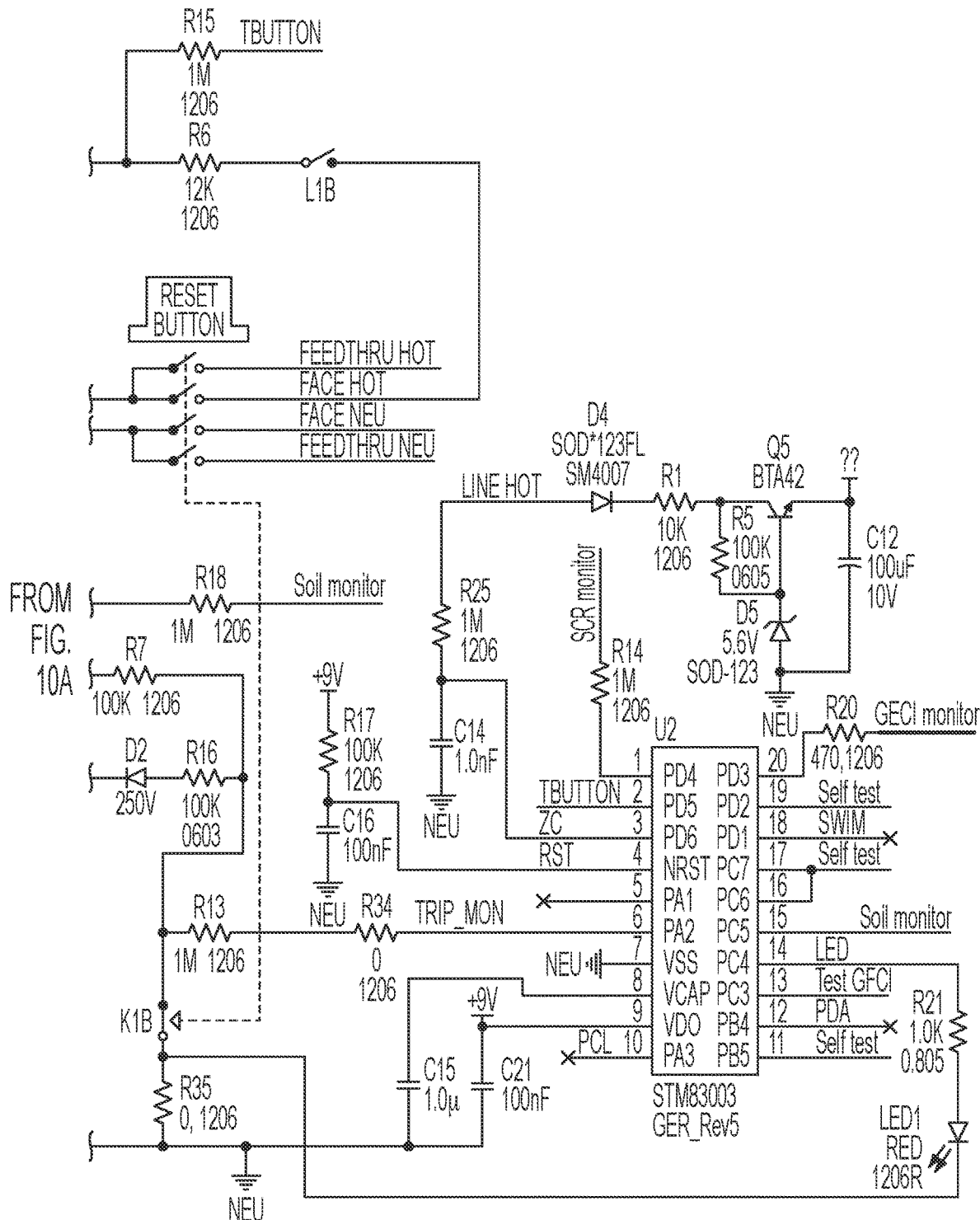

The ground fault interrupt circuit 1000, which is described briefly below in connection with FIG. 10, detects a ground fault and, together with trip mechanism 203, electrically decouples hot line terminal 102-1 and neutral line terminal 102-2 from hot load terminal arm 202-1 and neutral load terminal arm 202-2, respectively. Ground fault interrupt circuit 1000 is formed on electromechanical PCB 201, upon which trip mechanism 203 is also mounted.

Figure 11A:
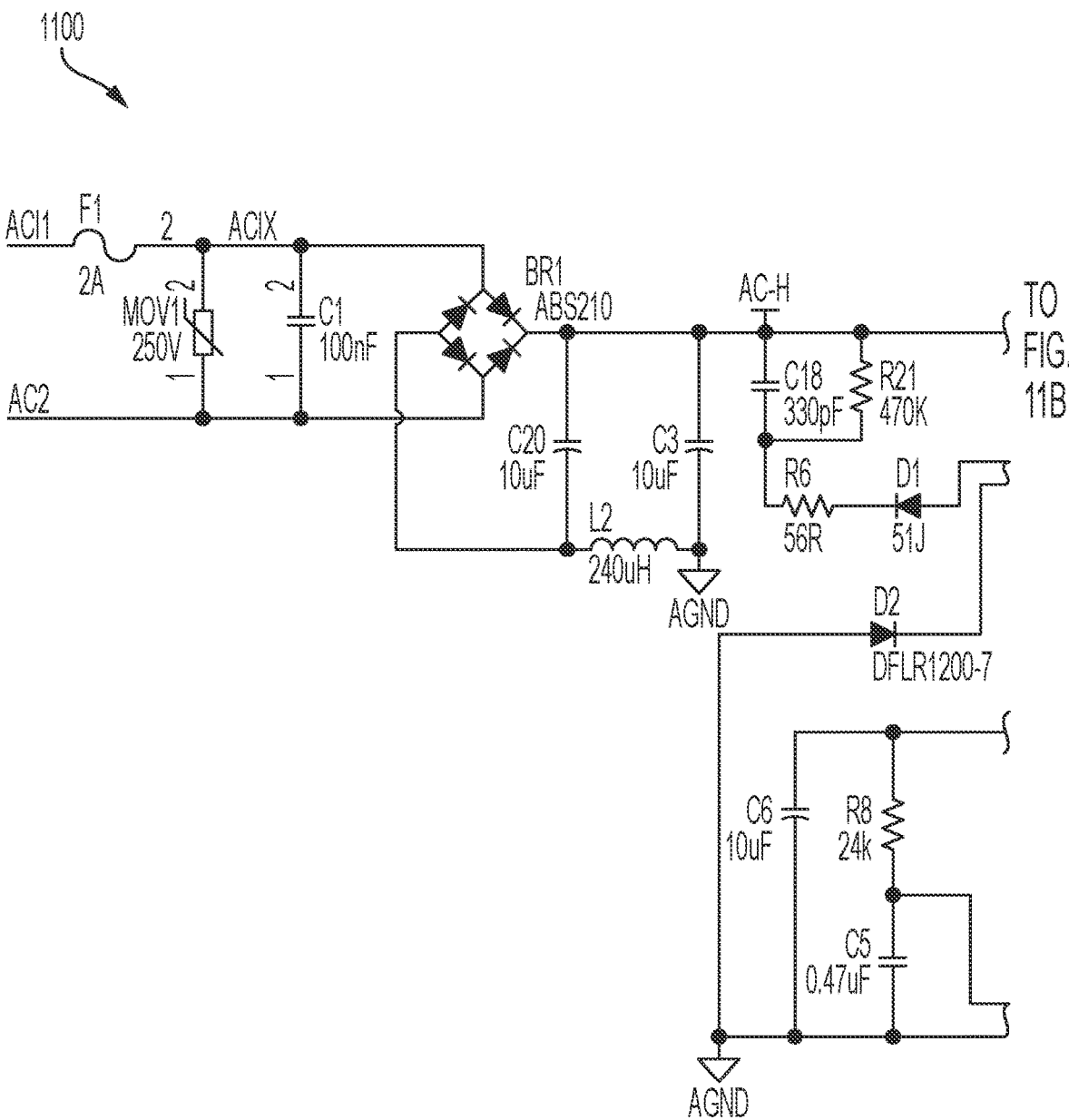
FIGS. 11A and 11B are a schematic of a USB power supply circuit, according to an example.
Figure 11B:
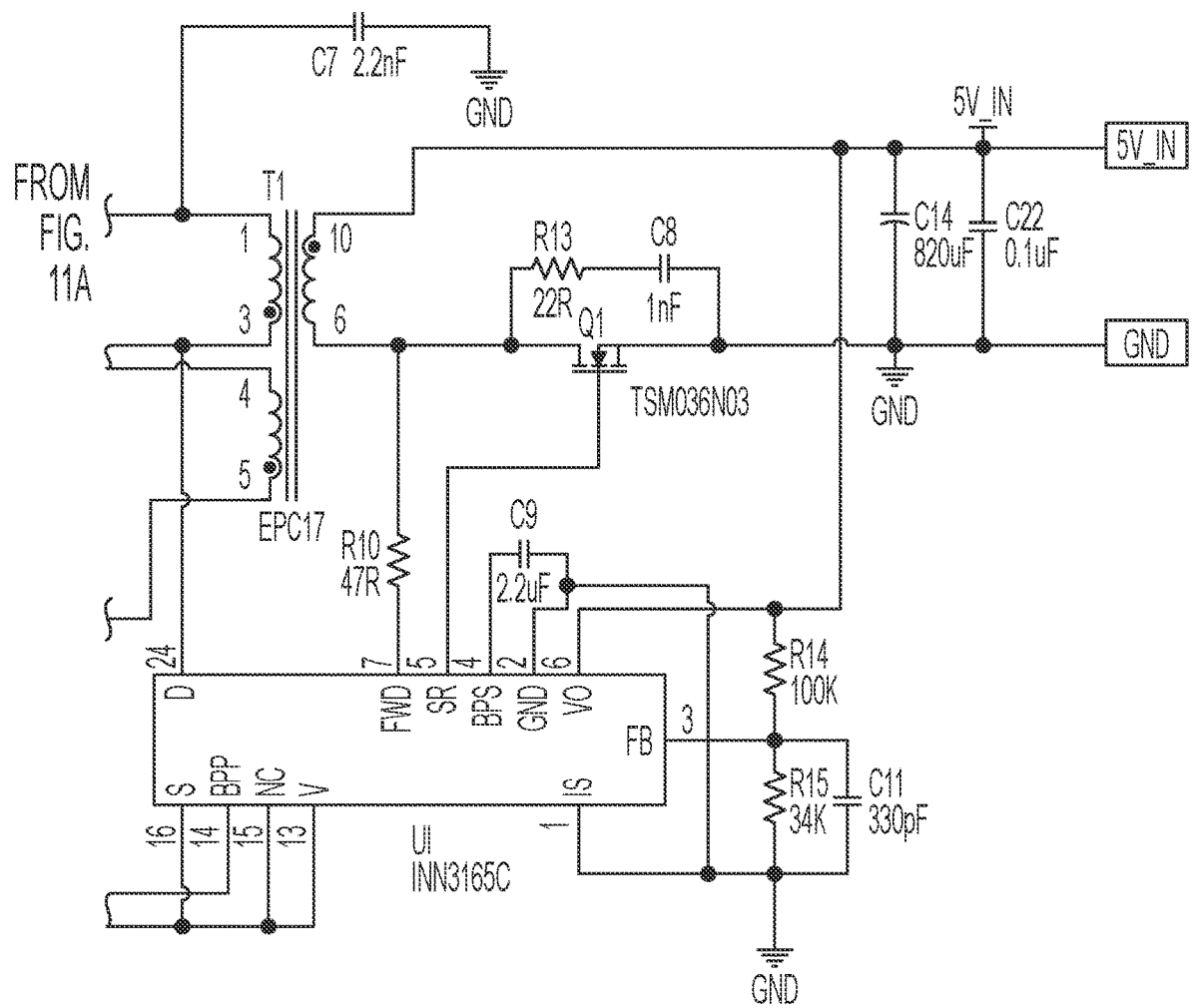

The USB power supply circuit 1100 converts the AC mains voltage, present across the hot line terminal 102-1 and neutral line terminal 102-2, to a USB voltage provided to USB receptacles 303-1, 303-2 for powering a connected device. The USB power supply circuit 1100 described briefly below in connection with FIG. 11, is formed on USB PCB 302. Both the USB PCB 302 and the electromechanical PCB 201 are disposed within an interior compartment of housing (e.g., within back body 14).

Figure 3:
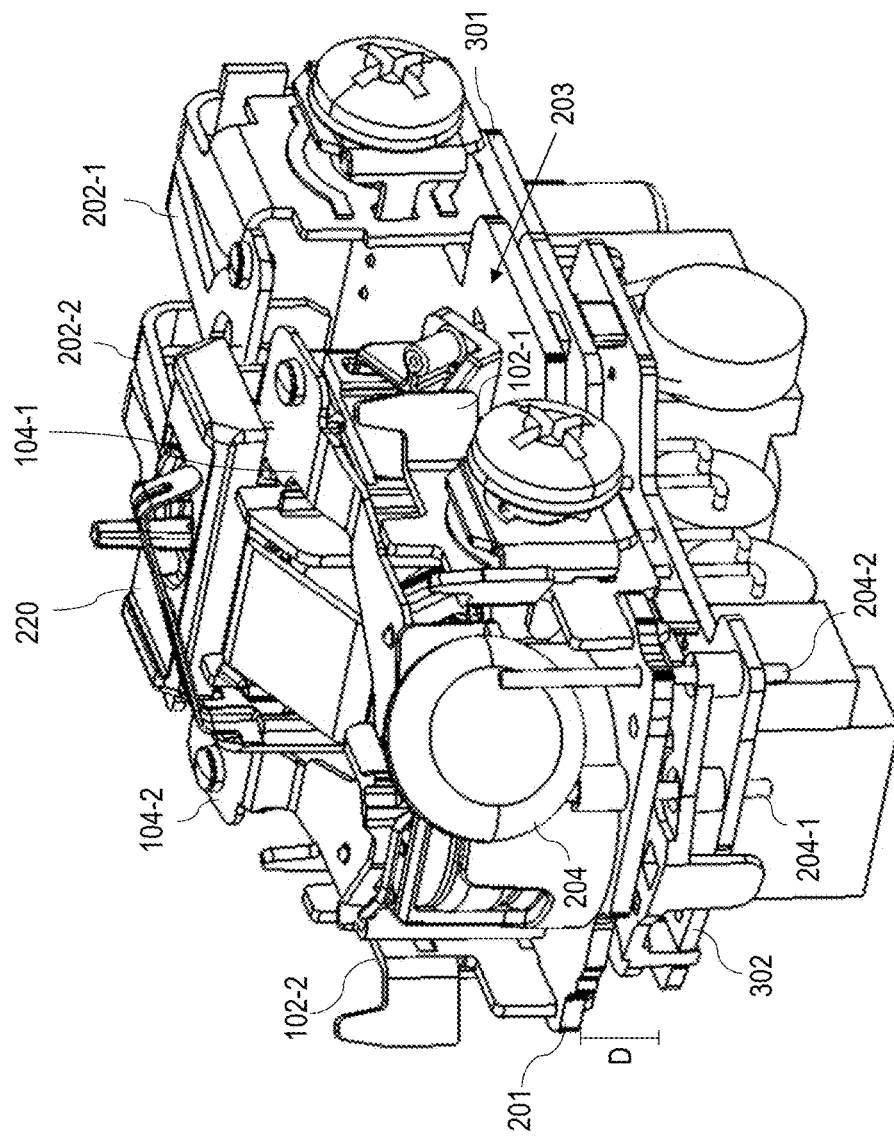
FIG. 3 is a perspective interior view of a portion of a protective device having a ground fault interrupt assembly and a USB power supply, according to an example.

FIG. 3 depicts perspective view of ground fault assembly 200, USB PCB 302, together with hot line contact arm 104-1, neutral line contact arm 104-2, hot line terminal 102-1, neutral line terminal 102-2, hot load terminal arm 202-1, neutral load terminal arm 202-2, and spacer 301. As shown, electromechanical PCB 201 is positioned some distance D from USB PCB 302. Distance D generally ensures that the ground fault interrupt circuit 1000 is electrically insulated from the USB power supply circuit 1100. To minimize the size of distance D, and thus minimize the profile of protective device 10, an insulative substrate 301 can be positioned between electromechanical PCB 201 and USB PCB 302. The insulative substrate 301 can be formed of any suitable material having a resistivity greater than that of the ambient air—e.g., rubber, plastic—and can thus be thinner than the width of an air gap required to insulate the ground fault interrupt circuit 1000 from the USB power supply circuit 1100. In an alternative example, rather than using insulative substrate 301, electromechanical PCB 201 and USB PCB 302 can be separated only by the air gap, although this will require a slightly larger profile of protective device 10 as the air gap must be larger than the thickness of insulative substrate 301 in order to ensure that electromechanical PCB 201 and USB PCB 302 are electrically insulated.

It should be understood that in certain examples, some of which are described below, there may be some electrical communication between ground fault interrupt circuit 1000 and USB power supply circuit 1100 (e.g., to supply the AC mains voltage to the USB power supply circuit). It should thus be understood that, for the purposes of this disclosure, maintaining electrical insulation between the ground fault interrupt circuit 1000 and USB power supply circuit 1100 entails preventing electrical contact between the respective circuits, except from connections that are designed to occur. Stated differently, the insulative substrate 301 is positioned to prevent unwanted electrical contact that would otherwise occur between the components of the stacked ground fault interrupt circuit 1000 and USB power supply circuit 1100.

Figure 4:
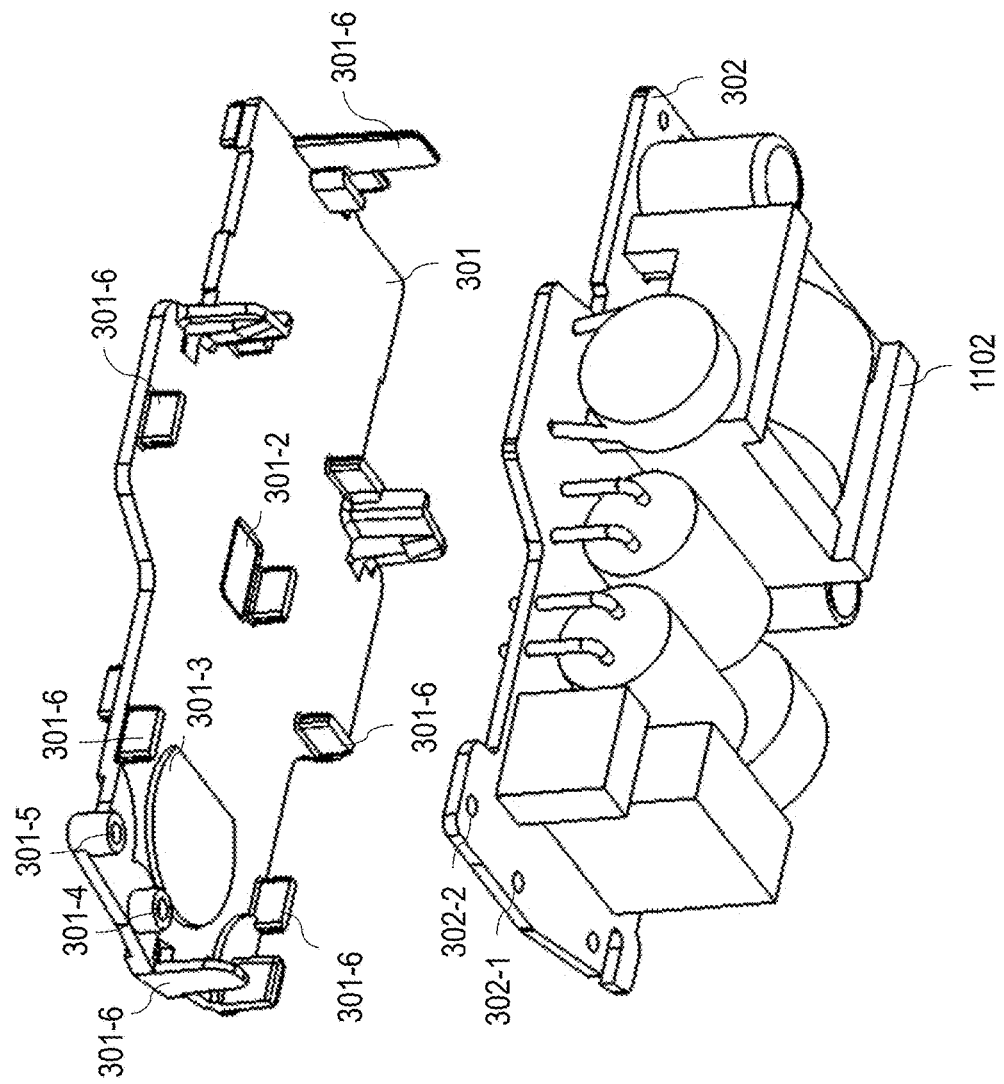
FIG. 4 is an exploded view of an insulative substrate and USB PCB, according to an example.

As shown in FIG. 4, to further minimize the distance D between electromechanical PCB 201 and USB PCB 302, insulative substrate 301 can define in its surface one or more recesses for receiving one or more components of either electromechanical PCB 201 or USB PCB 302, thus permitting electromechanical PCB 201 to be positioned closer to USB PCB 302. For example, recesses 301-2, 301-3 can be defined within the otherwise planar surface of the insulative substrate 301 to receive components such as jumpers and solder from electromechanical PCB 201 at recess 301-3 or a diode from USB PCB 302 at recess 301-2, as shown in FIG. 4. This is only provided as an example, however, and it should be understood that in various alternative examples, any number of recesses can each receive any number of any types of components to ensure that electromechanical PCB 201 is positioned as close as possible to USB PCB 302 while providing insulation between the respective circuits. Furthermore, as shown in FIG. 4 spacer 301 can be fitted to USB PCB 302 via snap fittings 301-6 to ensure that spacer 301 and USB power supply 302-1 remain held together compactly.

Both ground fault interrupt circuit 1000 and USB power supply circuit 1100 employ a metal-oxide varistor (MOV) to protect against transient voltages (i.e., voltage surges) that would otherwise damage ground fault interrupt circuit 1000 or the USB power supply circuit 1100. Because the MOV is a fairly large component, in order to reduce the size of the ground fault interrupt circuit and USB power supply circuit 1100 (and thus reduce the overall profile of protective device 10), a single MOV can be commonly shared between the ground fault interrupt circuit 1000 and the USB power supply circuit 1100. Stated differently, a single MOV can be commonly disposed between the hot and neutral input terminals of both the ground fault interrupt circuit 1000 and the USB power supply circuit 1100 to shunt current from each in the event of transient voltage. This can be accomplished by providing electrical contact between the hot inputs of both the ground fault interrupt circuit and the USB power supply circuit and one lead of the MOV and electrical contact between the neutral inputs of both the ground fault interrupt circuit and the USB power supply circuit and the other lead of the MOV. In this way, excess current from a voltage transient present in the AC mains voltage, will be shunted by the MOV common to both the ground fault interrupt circuit 1000 and the USB power supply circuit. Referring briefly to FIGS. 10 and 11, in this example, MOV2 of FIG. 10 and MOV1 of FIG. 11 are implemented as the same component.

Figure 5:
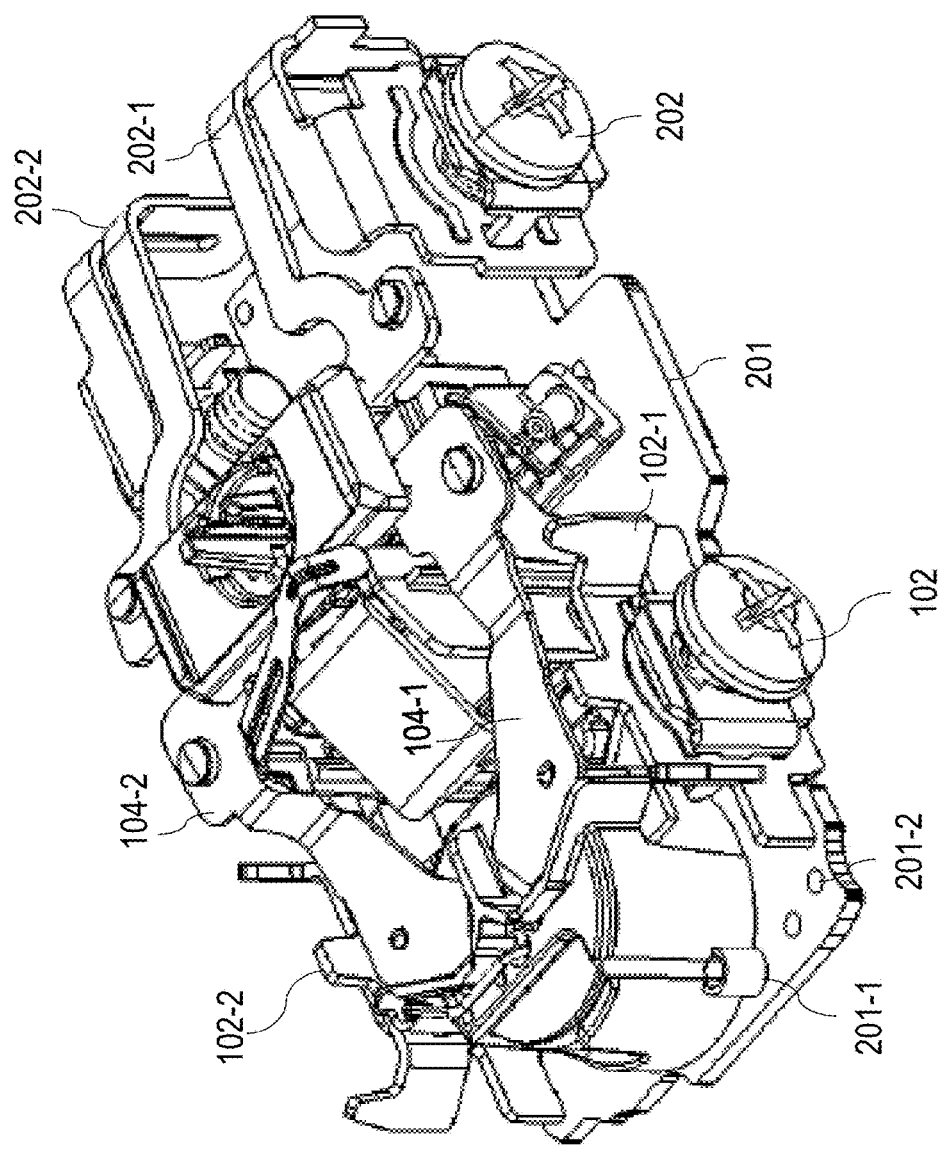
FIG. 5 is a perspective interior view of a portion of a protective device having a ground fault interrupt assembly and a USB power supply, according to an example.

Returning to FIG. 3, in order to electrically connect the same MOV 204 to both the ground fault interrupt circuit 1000 and the USB power supply circuit 1100, leads 204-1, 204-2 can be permitted to extend through the electromechanical PCB 201 to USB PCB 302, or, otherwise, from USB PCB 302 to electromechanical PCB 201. Where the leads of the MOV 204 would normally be trimmed when the MOV 204 is soldered to either electromechanical PCB 201 or USB PCB 302, the leads can be left untrimmed, thus spanning the distance D between the electromechanical PCB 201 and USB PCB 302, and allowing it to make electrical contact with both ground fault interrupt circuit 1000 and USB power supply circuit 1100. For example, as shown in FIG. 3, the leads of a MOV can extend through through-holes 201-1, 201-2 (shown in FIGS. 5 and 6) of the electromechanical PCB 201 across distance D separating electromechanical PCB 201 from USB PCB 302, and through the through-holes 302-1, 302-2 (shown in FIG. 4) of USB PCB 302. This example further can serve the dual purpose of bringing power from the hot and neutral terminals of the ground fault interrupt circuit 1000 to the hot and neutral terminals of the USB power supply circuit 1100. Otherwise, the USB power supply circuit would require a separate connection to the hot and neutral input terminals (e.g., through tabs on hot and neutral input terminals). Further, in this example, holes 301-4, 301-5 (shown in FIG. 4) defined in spacer 301 can further act to guide leads 204-1, 204-2 to USB PCB 302, and to permit leads 204-1, 204-2 to pass through spacer 301 to USB PCB 302 (where they would otherwise be blocked).

Alternatively, rather than employing the leads of the MOV 204, separate conductors (e.g., wires) can be used to make common electrical contact between the MOV 204 and both the ground fault interrupt circuit 1000 and the USB power supply circuit 1100. For example, MOV 204 can be soldered to one of the ground fault interrupt circuit 1000 and the USB power supply circuit 1100 and connected by a wire to the other.

Figure 7:
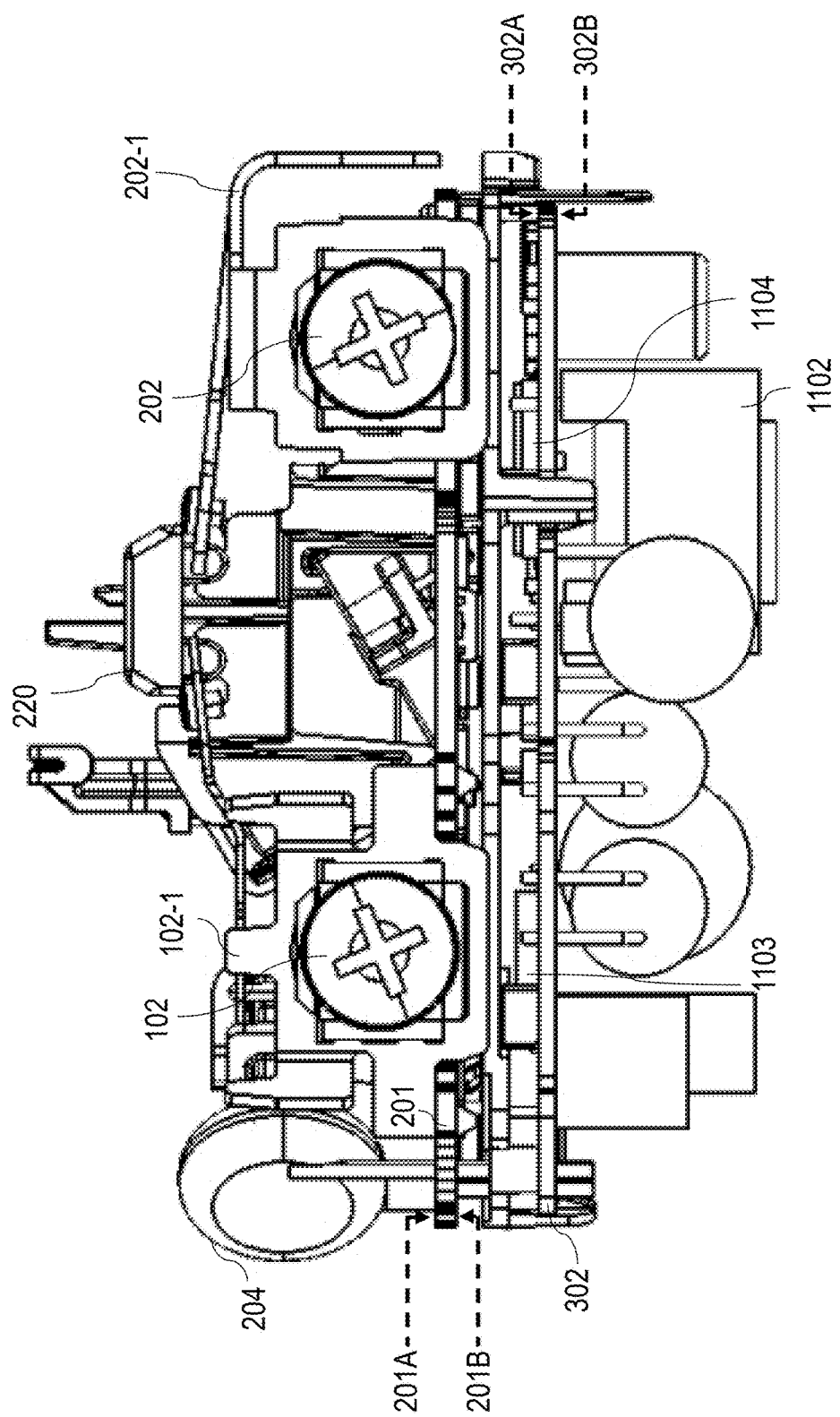
FIG. 7 is a side interior view of a protective device having a ground fault interrupt assembly and a USB power supply circuit, according to an example.

To further manage the heat produced by various components of the USB supply circuit, at least one component of the USB supply circuit can be positioned on a side of the USB PCB 302 facing away from electromechanical PCB 201. In the example of FIG. 7, certain components of the USB power supply circuit 1100 are positioned on the side of the USB PCB 302, i.e., on the side labeled 302B, facing away from electromechanical PCB 201. This placement of USB power supply circuit 1100 components functions to manage the heat produced by those components by situating the USB PCB 302 between the heat-generating components and the electromechanical PCB 201, thus thermally insulating the components of USB power supply circuit 1100 from the components of the ground fault interrupt circuit 1000. In addition, this positioning of the components of the USB power supply circuit 1100 increases the distance between the components of the USB power supply circuit 1100 and the components of the ground fault interrupt circuit 1000.

In the example of FIG. 7, only certain components—e.g., those that generate the most heat—are positioned on side 302B. For example, transformer 1102 (designated as T1 in FIG. 11) can be positioned on side 302B alongside various other components. However, as shown, other heat-generating components, such as bridge rectifier 1103 (designated as BR1 in FIG. 11), and controller 1104 (designated as U1 in FIG. 11), are situated on side 302A. These components are not positioned on side 302B in order to space them from transformer 1002 and to better manage spacing on USB PCB 302, where there is limited surface area to position components. In alternative example, all components of USB power supply circuit 1100 are positioned on side 302B in order to space them from the components of ground fault interrupt circuit 1000.

Figure 6:
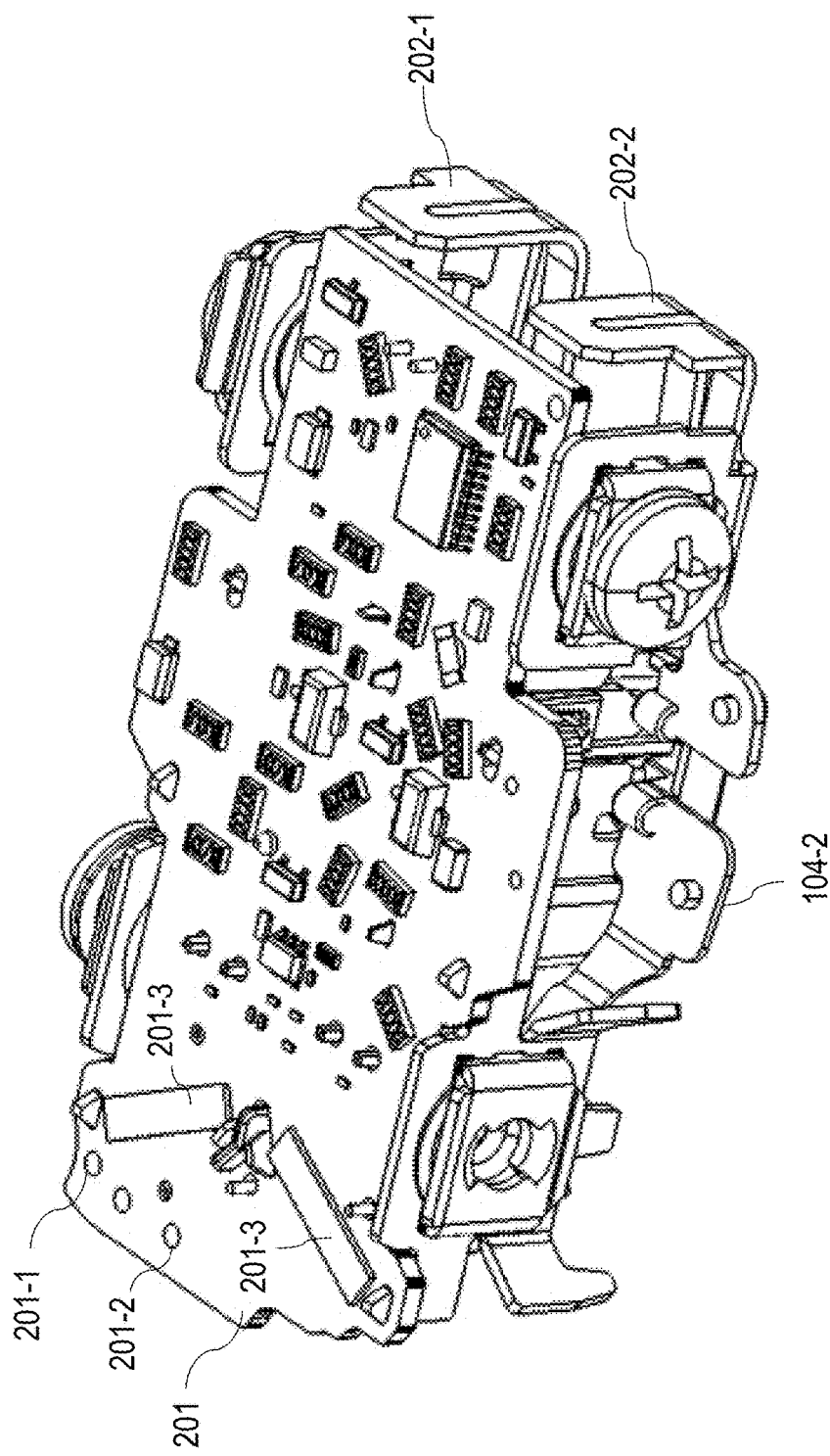
FIG. 6 is a perspective interior view of a portion of a protective device having a ground fault interrupt assembly and a USB power supply, according to an example.

Likewise, some or all components of the ground fault interrupt circuit 1000 can be positioned on side 201A of electromechanical PCB 201 facing away from USB PCB 302. As shown in FIG. 6, certain components of the ground fault interrupt circuit 1000 are faced toward USB PCB 302; however, in alternative examples, some of these components, or all of these components, can be positioned on the opposite side of electromechanical PCB 201 in order to increase the distance between the components of the USB power supply circuit 1100 and the ground fault interrupt circuit 1000 and to position the electromechanical PCB 201 as a thermal insulator.

Furthermore, the components on a single side of USB PCB 302 and electromechanical PCB 201 can be spaced to spread the heat generated across the PCB rather than concentrating it in one place. This can be seen, for example, by the relative positions of bridge rectifier 1103 and controller 1104, which are spaced across side 302A of USB PCB 302 to avoid concentrating the heat generated by each in a single location. In an example, the bridge rectifier 1103 and controller 1104 can be spaced by a distance of at least 15 mm to spread the heat generated across USB PCB 302. (In an example, a distance of 20 mm was shown to effectively spread the heat generating components across the surface of the USB PCB 302.)

To further manage heat, various components of protective device 10 can be comprised of materials having a thermal conductivity of at least 35% IACS. Such components can be, for example, hot line terminal 102-1, neutral line terminal 102-2, hot contact arm line 104-1, neutral contact line arm 104-2, hot load terminal arm 202-1, neutral load terminal arm 202-2, and jumpers 201-3. The material can, for example, be 7025 brass (which has a conductivity of 40% IACS), although it is conceivable that other materials could be used.

Figure 8:
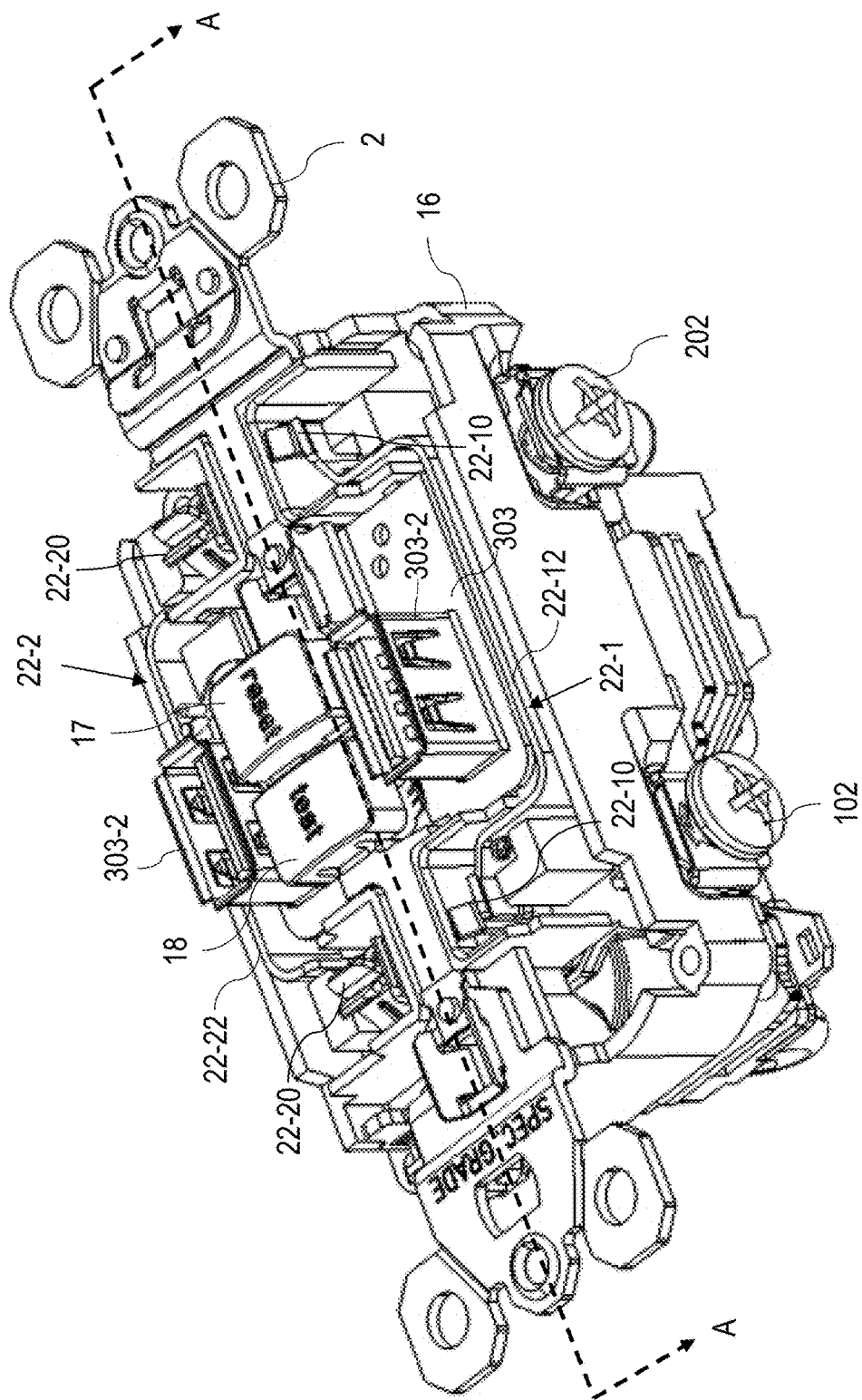
FIG. 8 is a perspective interior view of a portion of a protective device having a ground fault interrupt assembly and a USB power supply, according to an example.

Turning now to FIG. 8, a perspective view of the protective device 10 shows the separator 16, hot receptacle terminal 22-1, neutral receptacle terminal 22-2. As shown, hot receptacle terminal 22-1 includes a fixed contact bridge 22-12 and neutral receptacle terminal 22-2 includes fixed contact bridge 22-22. The fixed contact bridge 22-12 serves to provide electrical contact between the hot outlet receptacle contacts 22-10, and fixed contact bridge 22-22 serves to provide electrical contact between the neutral outlet receptacle contacts 22-20. Thus, by placing hot receptacle terminal 22-1 in electrical contact with hot line contact arm 104-1 (and hot load terminal arm 202-1) and by placing neutral receptacle terminal 22-2 in electrical contact with neutral line contact arm 104-2 (and neutral load terminal arm 202-2), the AC mains voltage will exist between the hot outlet receptacle contacts 22-10 and the neutral outlet receptacle contacts 22-20 as long as the protective device 10 is in the reset state. Once the protective device 10 enters the tripped state and trip mechanism 203 interrupts electrical contact between the hot line contact arm 104-1 and hot receptacle terminal 22-1 and between neutral line contact arm 104-2 and neutral receptacle terminal 22-2, the hot receptacle terminal 22-1 and the neutral receptacle terminal 22-2 will cease to be powered.

In order to further reduce the profile of protective device 10 fixed contact bridge 22-12 and fixed contact bridge 22-22 can be diverted toward the sidewalls of back body 14 (i.e., at an angle perpendicular to or oblique to axis A-A), allowing USB receptacle PCB 303 (and consequently, USB receptacles 303-1 and 303-2) to be disposed between fixed contact bridge 22-12 and fixed contact bridge 22-22 and, thereby, to be seated deeper in within back body 14. Stated differently, by diverting the fixed contact bridge 22-12 and fixed contact bridge 22-22 toward the sidewalls of housing—between hot outlet receptacle contacts 22-10 and neutral outlet receptacle contacts 22-20—fixed contact bridge 22-12 and 22-22 can be disposed to the sides of electromechanical assembly 200, and thus do not contribute to the profile of protective device 10. In the example shown, the diverted fixed contact bridge 22-12 and fixed contact bridge 22-22 can each be diverted toward a respective sidewall of back body 14, such that no other components are positioned between the diverted fixed contact bridge 22-12 and the sidewall of back body 14 and between fixed contact bridge 22-22 and the sidewall of back body 14. In an alternative example, electromechanical PCB 201 and/or USB PCB 302 can be positioned between the diverted fixed contact bridge 22-12 and fixed contact bridge 22-22 rather than, or in addition to, the electromechanical USB receptacle PCB 303.

Figure 9:
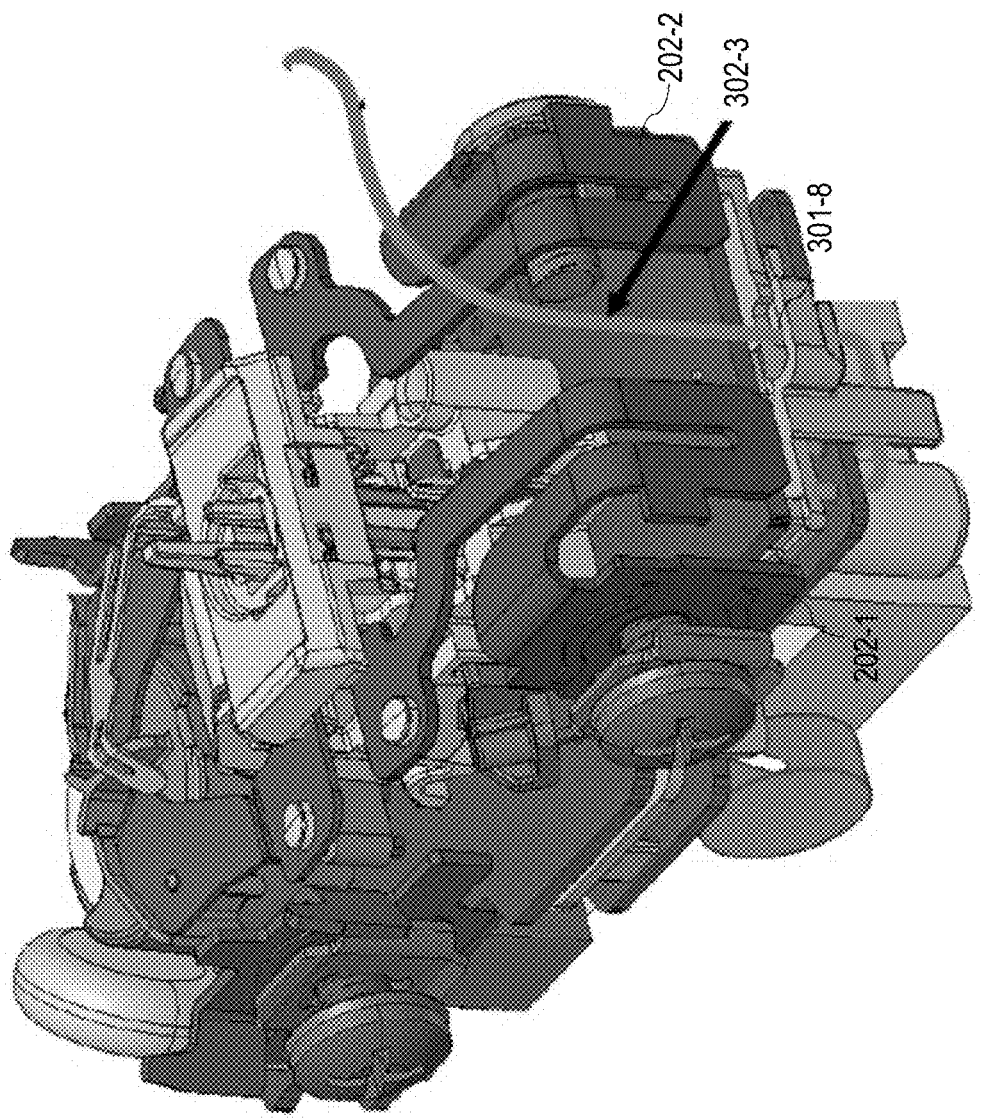
FIG. 9 is a perspective interior view of a portion of a protective device having a ground fault interrupt assembly and a USB power supply, according to an example.

As shown in FIG. 9, the output voltage of the USB power supply circuit 1100 can be provided to the USB receptacle 303-1, 303-2 via a conductive wire 302-3. To further minimize space requirements, the conductive wire 302-3 can be threaded between hot load terminal arm 202-1 and neutral load terminal arm 202-2. Conductive wire 302-3 can be maintained in position via an aperture 301-8 defined at the end of spacer 301.

It should be understood that any suitable ground fault interrupt circuit can be employed to trigger trip mechanism 203, a brief description of an example ground fault interrupt circuit 1000 is shown for the purpose of completeness. The protective device 10 includes a differential transformer 1002 which is configured to sense load-side ground faults, i.e. ground faults located in loads connected to load terminals or receptacle contacts. Transformer 1004 is configured as a grounded neutral transmitter that is configured for grounded-neutral fault detection. Both differential transformer 1002 and grounded-neutral transformer 1004 are electrically coupled to the fault detector U1. Detector U1 receives power from half wave rectification diode D1, inputting power to Vs pin 3 of detector U1 and further processed by internal regulation circuit. The output of the detector U1 is connected to the control input of SCR Q1. When SCR Q1 is turned ON, the solenoid coil K1A is energized to actuate the trip mechanism 203 such that the trip mechanism 203 opens and switch K1B closes. Solenoid coil K1A remains energized for a time period that is typically less than about 25 milliseconds. When the trip mechanism 203 trips, the line terminals are disconnected from their respective load terminals or receptacle contacts. After the fault condition has been eliminated, the trip mechanism 203 may be reset by way of reset button 17. MCU U2 provides additional functionality to monitor detector U1. MCU U2 is responsible for self-test, miswire detection and indicating status. Unlike detector U1 which only receives power and operates within the positive half cycles, MCU U2 has power and functions throughout the entire line cycle (positive and negative). This is accomplished via half wave rectification diode D4 and voltage regulator Q5, R5, D5, C12, where C12 provides storage during the negative half cycle. MCU U2 controls FET Q2 during self-test via Test GFCI node, where drain of Q2 is provided with a positive DC voltage via multiple IO via MCU U2. Various other IO of MCU U2 are utilized for basic yet essential standard MCU practices such as zero cross ZC monitoring, system power availability via RST node, programming nodes, etc. Some aspects of self-test and miswire test of MCU U2 will be described in detail below, with reference, as appropriate, to related patents. Other aspects of MCU U2 are known and do not require a detailed explanation here.

The differential transformer 1002 includes a secondary winding which is coupled to the fault detector U1 accompanied by noise filtering circuitry. The differential transformer 1002 senses the current differential between the hot and neutral conductors and provides a sensor signal to the ground fault detector U1 via the (IN−, IN+) inputs. When the differential current (sensor signal) exceeds a predetermined threshold value, the fault detector U1 should cause the SCR output to go HIGH.

The grounded neutral transmitter 1004 is configured to detect a grounded neutral condition. (The line neutral conductor is typically grounded in the electrical circuit at the panel—this does not constitute a grounded neutral fault condition). The neutral transmitter 1004 is configured to couple equal signals into the hot, neutral and self test (3rd wire) conductors. Because the differential transformer 1002 is configured to sense a current differential, the equal signals provided by the grounded neutral transmitter 1004 effectively cancel each other out. On the other hand, a grounded neutral condition does occur when the load neutral conductor (i.e., the conductor that is connected to the load neutral terminal or the neutral receptacle contact) is accidentally grounded. This creates a parallel conductive path (relative to the neutral return path) between the neutral line terminal and neutral load terminal. As a result, another signal circulates around this current loop and is coupled onto the neutral conductor (but not the hot conductor) to create a differential current. The differential transformer 1002 senses the differential current between the hot and neutral conductors and the detector U1 generates a fault detection signal to actuate SCR Q1, energize solenoid coil K1A and trip the trip mechanism 203.

Any suitable AC/DC power supply circuit may be used as the USB power supply circuit. An example of such a power supply circuit is shown in FIG. 11 as USB power supply circuit 1100. In this example, the input AC mains voltage is received at terminals AC1 and AC2. USB power supply circuit 1100 converts this input voltage to a 5V output voltage at terminals 5V_IN and GND. This 5V output voltage is used as the bus voltage Vbus of the USB type A receptacle. This output voltage is only provided as an example potential output voltage. Indeed, various types of USB connectors are designed to supply different voltages and thus, in alternative examples, USB power supply circuit 1100 can be designed to supply the voltage in keeping with the standard types of USB connectors employed in protective device 10. Alternatively, a separate output DC/DC output stage can be employed to further condition of the output of USB power supply circuit 1100 in keeping with the requirements of the type of USB receptacle employed.

In the example shown in FIG. 11, USB power supply circuit 1100 receives the AC mains input signal which is rectified and filtered via bridge rectifier BR1, capacitors C20, C3, and inductor L2. The rectified and filtered signal is input to transformer T1. Controller U1, which, in an example, is a Power Integrations INN3165C power supply controller, operates in secondary side sensing and regulation the feedback signal appearing at pin 3 through the voltage divider of R14 and R15. U1 contains an integral switching device (e.g., a MOSFET). While controller U1 keeps MOSFET ON, current in the primary winding of transformer T1 increases. During this time, current is prevented from flowing through the secondary winding of transformer T1 by MOSFET Q1, which is controlled by controller U1. (MOSFET Q1 serves as a secondary side rectifier. Generally, the MOSFET Q1 is preferred to the traditional diode due to its much lower on-state voltage, which results in less power loss and an increase in overall efficiency.) Once the controller turns the integral MOSFET OFF, it, at the same time, turns MOSFET Q1. The energy stored in the primary winding from the MOSFET ON-time is transferred to the secondary winding of T1, which charges output filter capacitor C14. (Capacitor C22 provides additional high-frequency attenuation.) Once controller U1 again turns the integral MOSFET off, the load current is supplied from the output filter capacitor C14. The integral MOSFET, transformer T1, and MOSFET Q1 together form a variant of a flyback converter. The snubber circuit, consisting of diode D1, resistor R6, capacitor C18, and resistor R21 effectively clamps the voltage and suppresses ringing on the drain of the MOSFET.

As described above, various output stages can be incorporated to further condition the output of USB power supply circuit 1100 for powering a Type-A or Type-C USB circuit. In addition, various controllers can be employed to communicate with the connected device as a dedicated charging port. For example, in addition to the above, a Texas Instruments TPS2513A dedicated charging port controller can be employed to monitor USB data voltage and automatically provide the correct electrical signatures on the data lines for charging.

As described above, USB power supply circuit 1100 can, as described above, receive power from a MOV commonly shared between the ground fault interrupt circuit 1000 and the USB power supply circuit 1100. Alternatively, tabs on the hot line terminal 102-1 and neutral line terminal 102-2 can be in electrical contact with and supply power to the USB power supply circuit 1100. Both of these methods for supplying power to the USB power supply circuit 1100, place the USB power supply circuit 1100 in electrical contact with the line-side of protective device 10. This is generally desirable, as it ensures that the high frequency switching of the USB power supply circuit 1100 will not cause nuisance trips of the trip mechanism 203. In an alternative example, however, USB power supply circuit 1100 can receive power from the load-side of protective wiring device (e.g., from tabs disposed at the ends of hot load terminal arm 202-1, neutral load terminal arm 202-2). While USB power supply circuit 1100 is already NEC class 2 power supply, which supplies acceptable protection from electric shock, by supplying power to the USB power supply circuit 1100 from the load-side, the USB power supply circuit 1100, and consequently the USB receptacles, will be disconnected from power in the event of a trip, providing redundant protection methods.

Although a dual-USB dedicated charging port example is described in this disclosure, it should be understood that protective device 10 can include any number of USB ports. Furthermore, as mentioned above, various alternative examples can employ the features described herein in conjunction with charging ports besides USB charging ports. In addition, certain features of described herein can be used to improve the profile size or heat management in devices that do not include power supply circuits (e.g., in GFCI-only protective devices) or in devices that do not include ground fault interrupt protective circuits or mechanisms.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device comprising:
    a plurality of line terminals including a hot line terminal and a neutral line terminal, wherein the plurality of line terminals are configured to be coupled to an AC electrical distribution system;
    a plurality of load terminals comprising a hot load terminal and a neutral load terminal;

a line conductor electrically coupling the hot line terminal to the hot load terminal;

a neutral conductor electrically coupling the neutral line terminal to the neutral load terminal;

a hot receptacle contact in electrical contact with the hot line terminal when in a reset state and neutral receptacle contact in electrical contact with the neutral line terminal when in the reset state, wherein the hot receptacle contact and the neutral receptacle contact are dimensioned and positioned to receive plug blades of a load plug;

a universal serial bus (USB) receptacle configured to receive a USB adapter;

a housing defining an inner compartment, wherein the line conductor, the neutral conductor, the hot receptacle contact, the neutral receptacle contact, and the USB receptacle are at least partially disposed in the inner compartment, a ground fault interrupt assembly disposed within the inner compartment, the ground fault interrupt assembly comprising a ground fault interrupt circuit, being formed on a first printed circuit board, and a trip mechanism, the ground fault interrupt circuit being configured to detect a differential current between the line conductor and the neutral conductor and to trigger the trip mechanism to electrically decouple the plurality of line terminals from the plurality of load terminals, according to a predetermined criterion, based, at least in part, on the different current, wherein the ground fault interrupt circuit is electrically insulated from the first printed circuit board by an insulative substrate disposed between the first printed circuit board and the second printed circuit board, wherein the insulative substrate is comprised of a material having a resistivity greater than ambient air; and a USB power supply circuit being formed on a second printed circuit board disposed within the inner compartment, the USB power supply circuit providing to the USB receptacle, wherein the first printed circuit board and the second printed circuit board are separated by a distance within the inner compartment.

2. The electrical wiring device of claim 1, further comprising a metal-oxide varistor being in common electrical contact with the ground fault interrupt circuit and the USB power supply circuit to absorb voltage transients in either the ground fault interrupt circuit or the USB power supply circuit.

3. The electrical wiring device of claim 2, wherein leads of the metal-oxide varistor extend through the first printed circuit board to the second printed circuit board or through the second printed circuit board to the first printed circuit board.

4. The electrical wiring device of claim 1, wherein a first surface of the insulative substrate is disposed adjacent to the USB power supply circuit, wherein at least one component of the USB power supply circuit is seated within a recess of the insulative substrate, the recess being dimensioned to receive the at least one component.

5. The electrical wiring device of claim 4, wherein a second surface of the insulative substrate is disposed adjacent to the USB power supply circuit, wherein at least one component of the USB power supply circuit is seated within a recess of the insulative substrate, the recess being dimensioned to receive the at least one component.

6. The electrical wiring device of claim 1, further comprising a second hot receptacle contact in electrical contact with the hot line terminal when in the reset state and a second neutral receptacle contact in electrical with the neutral line terminal when in the reset state.

7. The electrical wiring device of claim 6, wherein the hot receptacle contact is in electrical contact with the second hot receptacle contact by a first fixed contact bridge extending between the hot receptacle contact and the second hot receptacle contact, wherein the neutral receptacle contact is in electrical contact with the second neutral receptacle contact by a second fixed contact bridge extending between the neutral receptacle contact and the second neutral receptacle contact, wherein the first fixed contact bridge and the second fixed contact bridge are respectively diverted toward a perimeter of the housing, wherein at least one of a USB receptacle printed circuit board upon which the USB receptacle is mounted, the USB receptacle, the ground fault interrupt assembly, or the USB power supply circuit is, at least in part, disposed between the first fixed contact bridge and the second fixed contact bridge.

8. The electrical wiring device of claim 1, wherein the USB power supply circuit comprises a transformer, wherein the second printed circuit board includes a first side and a second side, wherein the first side faces the ground fault interrupt assembly, wherein the second side faces away from the ground fault interrupt assembly, wherein the transformer is disposed on the second side of the second printed circuit board.

9. The electrical wiring device of claim 8, wherein each of the components of the USB power supply circuit are disposed on the second side.

10. The electrical wiring device of claim 1, wherein the USB power supply circuit comprises a controller and a bridge rectifier, wherein the controller is separated from the bridge rectifier of by a distance of at least 15 mm.

11. The electrical wiring device of claim 1, wherein the ground fault interrupt assembly is disposed between the USB power supply circuit and a front cover, wherein the USB power supply circuit is electrically connected to the USB receptacle by a conductive wire extending past the ground fault interrupt assembly and between the line conductor and the neutral conductor.

12. The electrical wiring device of claim 1, wherein the USB power supply circuit is in electrical contact with the hot load terminal and the neutral load terminal to receive power when the electrical wiring device is in the reset state.

13. The electrical wiring device of claim 1, wherein the USB power supply circuit is in electrical contact with the hot line terminal and the neutral line terminal.

14. The electrical wiring device of claim 1, wherein the line conductor and the neutral conductor are comprised of a material having a conductivity at least 35% IACS.

15. The electrical wiring device of claim 14, wherein the line conductor and the neutral conductor are comprised of a brass material.

16. An electrical wiring device comprising:

a plurality of line terminals including a hot line terminal and a neutral line terminal, wherein the plurality of line terminals are configured to be coupled to an AC electrical distribution system;

a plurality of load terminals comprising a hot load terminal and a neutral load terminal;

a line conductor electrically coupling the hot line terminal to the hot load terminal;

a neutral conductor electrically coupling the neutral line terminal to the neutral load terminal;

a hot receptacle contact in electrical contact with the hot line terminal when in a reset state and neutral receptacle contact in electrical contact with the neutral line terminal when in the reset state, wherein the hot receptacle contact and the neutral receptacle contact are dimensioned and positioned to receive plug blades of a load plug;
a universal serial bus (USB) receptacle configured to receive a USB adapter;
a housing defining an inner compartment, wherein the line conductor, the neutral conductor, the hot receptacle contact, the neutral receptacle contact, and the USB receptacle are at least partially disposed in the inner compartment,
a ground fault interrupt assembly disposed within the inner compartment, the ground fault interrupt assembly comprising a ground fault interrupt circuit, being formed on a first printed circuit board, and a trip mechanism, the ground fault interrupt circuit being configured to detect a differential current between the line conductor and the neutral conductor and to trigger the trip mechanism to electrically decouple the plurality of line terminals from the plurality of load terminals, according to a predetermined criterion, based, at least in part, on the different current;
a USB power supply circuit being formed on a second printed circuit board disposed within the inner compartment, the USB power supply circuit providing to the USB receptacle, wherein the first printed circuit board and the second printed circuit board are separated by a distance within the inner compartment; and
a metal-oxide varistor being in common electrical contact with the ground fault interrupt circuit and the USB power supply circuit to absorb voltage transients in either the ground fault interrupt circuit or the USB power supply circuit.

17. The electrical wiring device of claim 16, wherein leads of the metal-oxide varistor extend through the first printed circuit board to the second printed circuit board or through the second printed circuit board to the first printed circuit board.

18. The electrical wiring device of claim 16, wherein the ground fault interrupt circuit is electrically insulated from the first printed circuit board by an insulative substrate disposed between the first printed circuit board and the second printed circuit board, wherein the insulative substrate is comprised of a material having a resistivity greater than ambient air.

19. The electrical wiring device of claim 18, wherein a first surface of the insulative substrate is disposed adjacent to the USB power supply circuit, wherein at least one component of the USB power supply circuit is seated within a recess of the insulative substrate, the recess being dimensioned to receive the at least one component.

20. The electrical wiring device of claim 19, wherein a second surface of the insulative substrate is disposed adjacent to the USB power supply circuit, wherein at least one component of the USB power supply circuit is seated within a recess of the insulative substrate, the recess being dimensioned to receive the at least one component.

21. The electrical wiring device of claim 16, further comprising a second hot receptacle contact in electrical contact with the hot line terminal when in the reset state and a second neutral receptacle contact in electrical with the neutral line terminal when in the reset state.

22. The electrical wiring device of claim 21, wherein the hot receptacle contact is in electrical contact with the second hot receptacle contact by a first fixed contact bridge extending between the hot receptacle contact and the second hot receptacle contact, wherein the neutral receptacle contact is in electrical contact with the second neutral receptacle contact by a second fixed contact bridge extending between the neutral receptacle contact and the second neutral receptacle contact, wherein the first fixed contact bridge and the second fixed contact bridge are respectively diverted toward a perimeter of the housing, wherein at least one of a USB receptacle printed circuit board upon which the USB receptacle is mounted, the USB receptacle, the ground fault interrupt assembly, or the USB power supply circuit is, at least in part, disposed between the first fixed contact bridge and the second fixed contact bridge.

23. The electrical wiring device of claim 16, wherein the USB power supply circuit comprises a transformer, wherein the second printed circuit board includes a first side and a second side, wherein the first side faces the ground fault interrupt assembly, wherein the second side faces away from the ground fault interrupt assembly, wherein the transformer is disposed on the second side of the second printed circuit board.

24. The electrical wiring device of claim 23, wherein each of the components of the USB power supply circuit are disposed on the second side.

25. The electrical wiring device of claim 16, wherein the USB power supply circuit comprises a controller and a bridge rectifier, wherein the controller is separated from the bridge rectifier of by a distance of at least 15 mm.

26. The electrical wiring device of claim 16, wherein the ground fault interrupt assembly is disposed between the USB power supply circuit and a front cover, wherein the USB power supply circuit is electrically connected to the USB receptacle by a conductive wire extending past the ground fault interrupt assembly and between the line conductor and the neutral conductor.

27. The electrical wiring device of claim 16, wherein the USB power supply circuit is in electrical contact with the hot load terminal and the neutral load terminal to receive power when the electrical wiring device is in the reset state.

28. The electrical wiring device of claim 16, wherein the USB power supply circuit is in electrical contact with the hot line terminal and the neutral line terminal.

29. The electrical wiring device of claim 16, wherein the line conductor and the neutral conductor are comprised of a material having a conductivity at least 35% IACS.

30. The electrical wiring device of claim 29, wherein the line conductor and the neutral conductor are comprised of a brass material.

31. An electrical wiring device comprising:
a plurality of line terminals including a hot line terminal and a neutral line terminal, wherein the plurality of line terminals are configured to be coupled to an AC electrical distribution system;
a plurality of load terminals comprising a hot load terminal and a neutral load terminal;
a line conductor electrically coupling the hot line terminal to the hot load terminal;
a neutral conductor electrically coupling the neutral line terminal to the neutral load terminal;
a hot receptacle contact in electrical contact with the hot line terminal when in a reset state and neutral receptacle contact in electrical contact with the neutral line terminal when in the reset state, wherein the hot receptacle contact and the neutral receptacle contact are dimensioned and positioned to receive plug blades of a load plug;
a universal serial bus (USB) receptacle configured to receive a USB adapter;

a housing defining an inner compartment, wherein the line conductor, the neutral conductor, the hot receptacle contact, the neutral receptacle contact, and the USB receptacle are at least partially disposed in the inner compartment, a ground fault interrupt assembly disposed within the inner compartment, the ground fault interrupt assembly comprising a ground fault interrupt circuit, being formed on a first printed circuit board, and a trip mechanism, the ground fault interrupt circuit being configured to detect a differential current between the line conductor and the neutral conductor and to trigger the trip mechanism to electrically decouple the plurality of line terminals from the plurality of load terminals, according to a predetermined criterion, based, at least in part, on the different current;

a USB power supply circuit being formed on a second printed circuit board disposed within the inner compartment, the USB power supply circuit providing to the USB receptacle, wherein the first printed circuit board and the second printed circuit board are separated by a distance within the inner compartment; and a second hot receptacle contact in electrical contact with the hot line terminal when in the reset state and a second neutral receptacle contact in electrical with the neutral line terminal when in the reset state, wherein the hot receptacle contact is in electrical contact with the second hot receptacle contact by a first fixed contact bridge extending between the hot receptacle contact and the second hot receptacle contact, wherein the neutral receptacle contact is in electrical contact with the second neutral receptacle contact by a second fixed contact bridge extending between the neutral receptacle contact and the second neutral receptacle contact, wherein the first fixed contact bridge and the second fixed contact bridge are respectively diverted toward a perimeter of the housing, wherein at least one of a USB receptacle printed circuit board upon which the USB receptacle is mounted, the USB receptacle, the ground fault interrupt assembly, or the USB power supply circuit is, at least in part, disposed between the first fixed contact bridge and the second fixed contact bridge.

32. An electrical wiring device comprising:

a plurality of line terminals including a hot line terminal and a neutral line terminal, wherein the plurality of line terminals are configured to be coupled to an AC electrical distribution system;

a plurality of load terminals comprising a hot load terminal and a neutral load terminal;

a line conductor electrically coupling the hot line terminal to the hot load terminal;

a neutral conductor electrically coupling the neutral line terminal to the neutral load terminal;

a hot receptacle contact in electrical contact with the hot line terminal when in a reset state and neutral receptacle contact in electrical contact with the neutral line terminal when in the reset state, wherein the hot receptacle contact and the neutral receptacle contact are dimensioned and positioned to receive plug blades of a load plug;

a universal serial bus (USB) receptacle configured to receive a USB adapter;

a housing defining an inner compartment, wherein the line conductor, the neutral conductor, the hot receptacle contact, the neutral receptacle contact, and the USB receptacle are at least partially disposed in the inner compartment, a ground fault interrupt assembly disposed within the inner compartment, the ground fault interrupt assembly comprising a ground fault interrupt circuit, being formed on a first printed circuit board, and a trip mechanism, the ground fault interrupt circuit being configured to detect a differential current between the line conductor and the neutral conductor and to trigger the trip mechanism to electrically decouple the plurality of line terminals from the plurality of load terminals, according to a predetermined criterion, based, at least in part, on the different current; and a USB power supply circuit being formed on a second printed circuit board disposed within the inner compartment, the USB power supply circuit providing to the USB receptacle, wherein the first printed circuit board and the second printed circuit board are separated by a distance within the inner compartment, wherein the USB power supply circuit comprises a transformer, wherein the second printed circuit board includes a first side and a second side, wherein the first side faces the ground fault interrupt assembly, wherein the second side faces away from the ground fault interrupt assembly, wherein the transformer is disposed on the second side of the second printed circuit board.

33. The electrical wiring device of claim 32, wherein each of the components of the USB power supply circuit are disposed on the second side.

34. An electrical wiring device comprising:

a plurality of line terminals including a hot line terminal and a neutral line terminal, wherein the plurality of line terminals are configured to be coupled to an AC electrical distribution system;

a plurality of load terminals comprising a hot load terminal and a neutral load terminal;

a line conductor electrically coupling the hot line terminal to the hot load terminal;

a neutral conductor electrically coupling the neutral line terminal to the neutral load terminal;

a hot receptacle contact in electrical contact with the hot line terminal when in a reset state and neutral receptacle contact in electrical contact with the neutral line terminal when in the reset state, wherein the hot receptacle contact and the neutral receptacle contact are dimensioned and positioned to receive plug blades of a load plug;

a universal serial bus (USB) receptacle configured to receive a USB adapter;

a housing defining an inner compartment, wherein the line conductor, the neutral conductor, the hot receptacle contact, the neutral receptacle contact, and the USB receptacle are at least partially disposed in the inner compartment, a ground fault interrupt assembly disposed within the inner compartment, the ground fault interrupt assembly comprising a ground fault interrupt circuit, being formed on a first printed circuit board, and a trip mechanism, the ground fault interrupt circuit being configured to detect a differential current between the line conductor and the neutral conductor and to trigger the trip mechanism to electrically decouple the plurality of line terminals from the plurality of load terminals, according to a predetermined criterion, based, at least in part, on the different current; and a USB power supply circuit being formed on a second printed circuit board disposed within the inner compartment, the USB power supply circuit providing to the USB receptacle, wherein the first printed circuit board and the second printed circuit board are separated by a distance within the inner compartment, wherein the ground fault interrupt assembly is disposed between the USB power supply circuit and a front cover, wherein the USB power supply circuit is electrically connected to the USB receptacle by a conductive wire extending past the ground fault interrupt assembly and between the line conductor and the neutral conductor.

\* \* \* \* \*